United States Patent Office 3,773,776
Patented Nov. 20, 1973

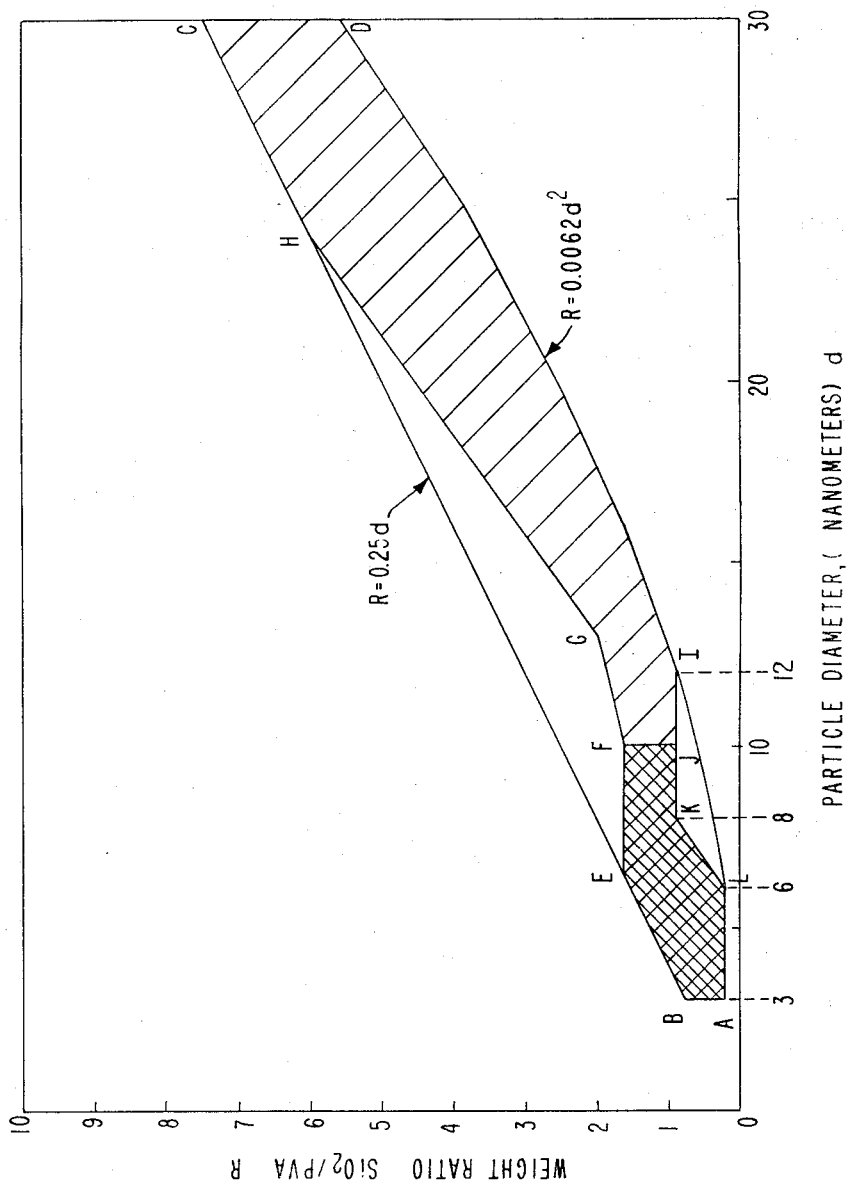

3,773,776
AQUEOUS ACIDIC POLYVINYL ALCOHOL-SILICA SOLUTION
Ralph K. Iler, Wilmington, Del., assignor to E. I. du Pont de Nemours and Company, Wilmington, Del.
Filed Mar. 31, 1971, Ser. No. 129,819
Int. Cl. C08f 45/24
U.S. Cl. 260—29.6 B
4 Claims

ABSTRACT OF THE DISCLOSURE

Compositions of colloidal silica having the average particle size diameter of 4–30 nanometers and of polyvinyl alcohol form coherent, homogeneous films that are water-resistant, provided the pH of such compositions is less than about 6 and that the following requirements are satisfied: the weight ratio of silica to the polyvinyl alcohol is greater than the numerical value of $0.0062\ d.^2$ but less than the numerical value of $0.25\ d.$, where $d.$ is the average particle diameter of the colloidal silica expressed in nanometers; but this ratio is always at least 0.22. The silica/polyvinyl alcohol films obtained in this manner are useful for greaseproofing and waterproofing paper and paper articles and for rendering surfaces slip-resistant.

BACKGROUND OF THE INVENTION

This invention relates to novel aqueous acidic solutions containing polyvinyl alcohol (PVA) and colloidal silica in specified proportions which can be concentrated without phase separation and can be dried to coherent, water-resistant films, useful in paints and coatings.

U.S. Patent 2,833,661 (to Iler) discloses the use of a PVA solution containing alkali-stabilized colloidal silica as a binder for clay in paper coatings. This reference does not disclose acidic mixtures of PVA with silica.

U.S. Patent 3,390,203 (to Engelhardt) discloses a composition in a polar organic solvent comprising polysilicic acid and a polymer which may be polyvinyl alcohol, the composition also containing at least one block copolymer of lower alkylene oxides with dimethylsiloxane. Polysilicic acid consists of polysiloxane units in the form of chains or networks of low molecular weight which are unstable in aqueous solution.

U.S. Patent 3,357,930 (to Marks) describes transparent films comprising polyvinyl alcohol, glycerine, lithium chloride, and polysilicic acid. Polysilicic acid is so readily polymerized to a silica gel that in the absence of humectants the gel shrinks and no film is obtained. When humectants, such as glycerine and lithium chloride are used to retain sufficient water to maintain integrity of the film composition, the films can be expected to be destroyed by water as the humectants are removed and the film is then dried.

SUMMARY OF THE INVENTION

According to the present invention, coherent homogeneous film-forming compositions can be obtained from an aqueous solution containing polyvinyl alcohol and colloidal silica only if the mixture has been acidified to low pH. Furthermore, the proportion of polyvinyl alcohol to silica must be within certain critical limits in order to obtain a homogeneous solution which will dry to a coherent film that is water-resistant.

The average particle size of silica is 4–30 nanometers; the weight ratio of $SiO_2$ to PVA in solution should be greater that the numerical value of $0.0062\ d.^2$, and at least 0.22 but less than the numerical value of $0.25\ d.$, where $d.$ is the average diameter of the colloidal silica particles, in nanometers; and the pH of the solution is adjusted to less than about 6.

One nanometer (1 nm.) is equal to $10^{-9}$ meter and corresponds to the earlier unit, one millimicron.

DESCRIPTION OF THE DRAWING

The drawing illustrates the requisite relationship between the $SiO_2$/PVA weight ratio and the average silica particle diameter in nanometers.

DETAILED DESCRIPTION OF THE INVENTION

The critical value, which bears on the operability of the invention is the weight ratio of silica to PVA in the film-forming compositions. An insufficient proportion of silica to PVA results in dried film compositions which are very water-sensitive or water-soluble, while an excessive proportion of colloidal silica makes the film extremely weak and brittle; if silica is in further excess, there separates a coacervate which has no film-forming properties. This critical ratio must be maintained even though the silica particle diameter and the pH of the solution are within the required ranges.

The numerical relationship between the $SiO_2$/PVA ratio and the average $SiO_2$ particle diameter is given above, in the Summary of the Invention. However, this relationship can be expressed in a more convenient, and perhaps more accurate, manner by reference to the drawing. The $SiO_2$/PVA weight ratio, R, is plotted on the ordinates; and the particle diameter, $d.$, in nanometers, is plotted on the abscissae. The weight of silica is expressed on anhydrous weight basis.

The points on the graph have the following parameters:

| | d. | R |
|---|---|---|
| A | 3 | 0.22 |
| B | 3 | 0.75 |
| C | 30 | 7.5 |
| D | 30 | 5.6 |
| E | 6.4 | 1.6 |
| F | 10 | 1.6 |
| G | 13 | 2.0 |
| H | 24 | 6.0 |
| I | 12 | 0.89 |
| J | 10 | 0.89 |
| K | 8 | 0.89 |
| L | 6 | 0.22 |

Within the operable area ABEHCDILA on the graph, there also is a preferred area ABEFGHCDIJKLA, indicated by crosshatching, and, further, the most preferred area ABEFJKLA, indicated by double crosshatching. Under the most preferred conditions, the silica particles will have the average particle size of 3–10 nanometers, and the $SiO_2$/PVA ratio will range from 0.22–0.75 for the 3 nm. particles to 0.89–1.6 for the 10 nm. particles. In this area, films having maximum resistance to warm or hot water are obtained.

The polyvinyl alcohol useful in preparing the compositions of the present invention must be water-soluble, i.e., it must be capable of forming a viscous solution in water at 80° C., rather than merely swelling.

Polyvinyl alcohol is usually prepared by either partial or complete hydrolysis of an ester, such as polyvinyl acetate. Fully hydrolyzed polyvinyl acetate, i.e. polyvinyl alcohol containing less than about 1% of the original acetoxy groups, is generally insoluble in cold water but soluble in hot or warm water. This is the preferred type of polyvinyl alcohol useful in the present invention. Partially hydrolyzed polyvinyl acetate, i.e. polyvinyl alcohol containing up to about 15% of the original acetoxy groups, can be used, but such PVA is more water-sensitive and more difficult to insolubilize by incorporation therewith of colloidal silica.

The molecular weight of suitable PVA is such that a 4% aqueous solution of the polymer at 20° C., as determined by the Hoeppler falling ball method (cf., K. J. Mysels, Introduction to Colloid Chemistry, Interscience Publishers, Inc., New York, N.Y., 1959, pp. 256–257) is 5 to 150 cps. This would correspond to a degree of polymerization of from about 200-300 to slightly over 2000. The PVA with lowest viscosity is commonly used as a binder for clay in paper coatings. A very water-resistant coating is obtained using the water-resistant PVA-colloidal silica dried compositions as the binder for clay. Polyvinyl alcohols with viscosities over 120 cps. are very viscous, form strong films which are relatively insoluble in cold water, but will dissolve in hot water. The incorporation of colloidal silica into these films made in accordance with the present process improves the water-resistance so that films of this type remain strong and coherent even after being immersed in boiling water, in which the unmodified PVA film dissolves.

The colloidal silica used in this invention is preferably in the form of an aquasol made from sodium silicate. Silica sols of commerce generally contain from 15% to 50% by weight of silica solids, depending on the particle size of the silica, the higher concentrations being available when the particles are as large as 20 or 30 nanometers in diameter. Such sols are generally stabilized with a small amount of base, and have a pH between 8 and 10.

Silica sols of different particle sizes can vary from 3 to 30 nanometers. Sols of different particle size may be mixed, but generally a sol having an average particle size of 10 nanometers wil lhave more than 90% of the particles within the range from 5 to 15, for example. Because of the difficulty of measuring the particle diameter of colloidal silica (using electron microscope) when the particles are smaller than about 10 nm., it is preferred to characterize the colloidal silica sols in terms of specific surface area of colloidal silica as determined by a titration procedure described by G. W. Sears, Jr., in Analytical Chemistry, 28 1981 (1956). Alternative procedures are described by G. B. Alexander and R. K. Iler, in the Journal of Physical Chemistry, 57, 932 (1953).

Colloidal silicas having particles as small as 3 to 5 nm., described by G. B. Alexander in U.S. Patent 2,750,345, are made by decationizing a solution of sodium silicate with the hydrogen form of an ion exchange resin.

A typical sol useful in the process of this invention is a commercial material sold under the trade name Ludox® SM (Du Pont Company). It has an average particle size of 7 to 8 nanometers and a specific surface area of 375 to 420 m.$^2$/g.; contains 30% by weight of silica; and has a pH of 9.9. It is stabilized with 0.6% by weight of alkali calculated as $Na_2O$. Similar alkali-stabilized products having particle sizes of 5, 14, or 22-25 nanometers diameter can be used. Equally suitable commercial silica sols are available under such trade names as Nalcoag® (Nalco Chem. Co.) and Syton® (Monsanto Co.). For maximum PVA insolubilization, a smaller particle silica sol is preferred.

The compositions of this invention can be prepared in any suitable manner that will give a homogeneous dispersion of colloidal silica in polyvinyl alcohol, having a pH less than 6. Homogeneity is observed by the fact that the mixtures are transparent or translucent and free from visible particles or sediment. In order to observe the nature of the mixtue, it is necessary to remove air bubbles by letting the mixture stand or applying a vacuum.

The polyvinyl alcohol powder is usually first dissolved in water, e.g., by stirring the dry powder into water and then heating the mixture to 80-100° C. until a clear, homogeneous solution is obtained. The concentration may range from as low as 1 or 2% to 15 or 20%, depending on the molecular weight of the polymer. Pourable solutions of polymers of low inherent viscosity can be prepared at concentrations as high as 15%; high molecular weight polymers with a viscosity over 150 cps. even in hot solutions give mixtures which are so viscous even at 5% concentration that they cannot readily be stirred. In some cases, the polyvinyl alcohol powder can be stirred into the aqueous alkali-stabilized colloidal silica sol to disperse the PVA particles, and then the mixture is warmed until the PVA dissolves. Usually, this is done with sols containing less than 10% $SiO_2$ by weight. The alkali-stabilized sol can also be stirred with an aqueous solution of polyvinyl alcohol. In this case, two liquid phases may be present if the solutions are concentrated. These mixtures can be heated above pH 7 without danger of gelling the silica. If the PVA and silica are first mixed on the alkaline side, the mixture should be permitted to cool to less than 40° C., preferably to about 25° C. or less, and then acidified with stirring, to lower the pH to less than 6, and preferably less than 5.

The most convenient procedure is to dilute the colloidal silica to about half the concentration at which it is originally stabilized on the alkaline side, add sufficient acid to lower the pH to below 5 at ordinary temperature, and then add the polyvinyl alcohol solution and mix well. The acid mixtures should not have a temperature over about 40° C., especially if the pH is between 4.5 and 5, because in this particular pH range colloidal silica may gel. If the mixture gels, it cannot be spread to a film or used as a binder.

While it is required by the process of the present invention to maintain an acidic pH in the silica/PVA compositions, a pH less than 5 is preferred. On the other hand, there is no advantage in having the pH much lower than about 2. With silica particles over 10 millimicrons in diameter, best insolubilization of PVA is obtained when the pH is in the range 2 to 5. For mast compositions of the invention, a pH of about 4 is most satisfactory.

Although the insolubilization of polyvinyl alcohol by colloidal silica is probably due in part to hydrogen bonding of PVA to the SiOH groups present on the surface of silica particles, it also appears that drying of the PVA film is accompanied by linking together of colloidal silica particles throughout the polymer into a tridimensional network. This silica gel network appears to inhibit water penetration to the polymer as well as swelling and dissolution of the polymer. A third phenomenon can occur on heating of the film above 100° C., namely a reversible esterification of the SiOH silicic acid groups with the hydroxylic groups of polyvinyl alcohol.

The aqueous solutions and films of the present invention are suitable for many applications. They can be, for example, further diluted, admixed or emulsified with water-immiscible oils, waxes, or with particulate materials such as pigments, clays, polymers, or fibers; and these mixtures can be employed as coatings for paints or adhesives. Alkaline pigments, such as $CaCO_3$, should be avoided.

For example, the compositions of this invention can be admixed with polyvinyl acetate emulsions or employed as the dispersion medium for polyvinyl acetate particles, which, in turn, can be dried to paints, films, or coatings having improved water resistance. Unmodified compositions of the invention consisting essentially of polyvinyl alcohol and colloidal silica can be used for depositing colloidal silica, especially of particle size larger than 10 nanometers, as an adherent film on surfaces to render the surfaces slip-resistant.

Films of this invention spread on paper provide water-resistant coatings that are grease- and oil-proof. The coated paper can be used for such diverse applications as separating slabs of uncured rubber, packing grease or oily foodstuffs, lining paperboard containers for oily materials, or for coating meat-wrapping paper. For these purposes, usually a medium to high molecular weight polyvinyl alcohol will be employed. For coating compositions such as paints or paper coatings, where high solids content and lowest possible viscosity is desired, the polyvinyl alcohol of lowest molecular weight and viscosity is combined with the maximum amount of smallest particle size colloidal silica within the limits of the present invention. For white clay paper coatings applied to improve printability of paper, a low molecular weight polyvinyl alcohol with a minimum of colloidal silica will be employed, since only a minimal improvement in water resistance is required.

Pigmented compositions of clay or titanium dioxide and polyvinyl alcohol are improved by the incorporation of colloidal silica according to the process of this invention to make water-resistant, opaque coatings for paper or papier mâché dishes.

The film-forming behavior of the aqueous compositions of the present invention is observed by spreading a thin layer on a glass plate and permitting to air-dry at 25 to 30° C. for 24 hours. The glass plate is previously scoured with cleansing powder, rinsed and dried, to remove greasy materials, so that the surface is clean and hydrophilic. The film on the glass is further dried by heating at 60° C. for 24 hours.

After drying, the appearance of the film is noted, i.e., whether it is clear and transparent, or cloudy due to inhomogeneous distribution of silica and PVA; whether it is a coherent film or cracked into fragments; and whether it is loose from the glass and curled, or flat, smooth and adherent.

Water resistance is examined whether or not the film is loose from the glass, by immersing different samples in cold water at 30° C. for 24 hours, and in hot water at 80–90° C. for 1 hour. Generally, the film swells to some extent and is softer than in the dried state, but its resistance to dissolution in water is observed by noting whether part of the film has dissolved, or whether the surface is slippery with dissolving material. Some prior art films may disintegrate into soft fragments, but in other cases a film may swell to such an extent that it is essentially a weak jelly. Compositions of the present invention are sufficiently water-resistant to remain coherent in water at 30° C. and do not dissolve or disintegrate. They may become relatively soft in hot water but in cold water retain some strength. For use as a binder for clay or for a frictionizing film where under final use conditions the compositions are not exposed for prolonged periods to wet conditions, it is only necessary that the binder composition of polyvinyl alcohol and silica in the form of a film remain coherent in water at 30° C., since this type of composition retains sufficient strength as a binder for small particles or fibers to prevent disintegration of such coatings in water.

Films of the invention containing silica to PVA weight ratios near the upper limit develop some cracks when dried on glass and may come loose in the form of brittle fragments ½″ or more in width. When these fragments are tested in water at 30° C., they remain coherent and become flexible, but when redried, still remain coherent. Such compositions are useful as film-formers, when applied to porous surfaces such as paper, for example, where the film does not have to bridge pores or spaces larger than a few tenths of a millimeter distance. In this case, the flexible support provides film continuity. Such silica-rich films are highly water resistant.

This invention is now illustrated by examples of certain preferred embodiments thereof, wherein all parts, proportions, and percentages are by weight unless otherwise indicated.

EXAMPLE 1

As an example of a composition of this invention which dries to a strong film that is resistant to hot and cold water, one employs a polyvinyl alcohol having a viscosity of 125 cps. in a 4% solution at 20° C., made by 99% hydrolysis of polyvinyl acetate, known as Elvanol® 73–125 (Du Pont Company), and a colloidal silica having an average particle size of 8 nanometers and a specific surface area of 375 m.$^2$/g. of silica, in the proportion of 1.5 parts of silica per 1 part of polyvinyl alcohol. The colloidal silica obtained as a concentrated sol containing 30% of $SiO_2$ and stabilized by alkali in an amount corresponding to 0.6% of sodium oxide, is diluted to a concentration of 30 grams of silica per 100 milliliters. The polyvinyl alcohol, obtained as a powder, is made up as a solution in water by stirring 10 parts of powder with 90 parts of water, and then heating the mixture with continuous stirring to 90° C. for one hour. This polyvinyl alcohol has such a high viscosity that at one stage in dissolving, the swollen powder forms a thick mass with the water so that stirring is difficult until the mass liquefies when the temperature reaches 80° C. The polyvinyl alcohol solution is cooled to 50° C. and 100 volumes containing 10 parts of PVA are mixed with 50 volumes of silica sol containing 15 parts of silica, giving a mixture at a temperature of 35° C. which is then acidified to a pH of 2.5 by adding 5.5 volumes of a 12% solution of nitric acid. The finely dispersed bubbles of air are removed from the solution by adding 0.2 volume of normal octyl alcohol and deaerating in vacuum. The solution is applied as a thin, continuous film to the surface of Kraft paper, dried and used for wrapping raw meat; the water and fat do not penetrate the paper.

EXAMPLE 2

As an example of a composition of this invention useful as a film-former and pigment binder in a water-based paint, a composition is prepared from polyvinyl alcohol having a viscosity of 30 cps. and a colloidal silica having an average particle diameter of about 5 nanometers. The procedure for making up the mixture is the same as in Example 1. The polyvinyl alcohol is dissolved to give a solution containing 10 g. of PVA per 100 mls. of solution. The colloidal silica employed is a material sold under the trade name Nyacol® grade 215 by Nyanza, Inc., Ashland, Mass., which is determined to have an average particle size of about 5 nanometers, the specific surface area of the silica particles by the titration technique being 500 m.$^2$/g. This material contains 16.8 g. of $SiO_2$ per 100 mls., and is stabilized with alkali corresponding to 1 part of $Na_2O$ per 25 parts of $SiO_2$. The composition of this invention is prepared by mixing 50 parts by volume of the 10% PVA solution, 34.5 parts by volume of the colloidal silica sol, 14 parts by volume of water, and 2 parts by volume of a 12% aqueous solution of nitric acid to lower the pH of the mixture to 2.5. The weight ratio of $SiO_2$ to PVA is 1.16. The deaerated, clear solution gives on glass a clear, hard, water-insoluble film that is not removed by immersion in water at 80° C. for 24 hours.

A whit paint is prepared by mixing 2.7 parts by weight of titanium dioxide pigment powder into 25 parts by weight of the PVA-silica solution, and thoroughly mixed until a smooth, white, somewhat viscous paint is obtained. This is employed for coating paper dishes and for painting white pine wood. The dried paint film is not penetrated by oil or water and is resistant to rain and weathering.

EXAMPLE 3

A composition is prepared like that of Example 2, but having a weight ratio of silica to PVA of 0.87. When the film from the solution is dried on glass, it is found to be less brittle than that from the composition of Example 2, but is somewhat softer after being exposed to water at 80° C. for 24 hours. It is used as an adhesive for laminating paperboard.

EXAMPLE 4

Compositions of this invention made with relatively large particles of colloidal silica from 15 to 30 nanometers in diameter, are useful as a finish for increasing the friction and decreasing the slipperiness of plastic sheet material to make it more readily handled on machines and in rolls.

A composition is made from 75 grams of polyvinyl alcohol and colloidal silica having a particle diameter of 22 nanometers, the amount of silica solids being 250 grams, and the weight ratio of silica to PVA being 3.35. The mixture is prepared by dissolving 75 g. of polyvinyl alcohol powder (Elvanol® 9050, Du Pont), which is a fully hydrolyzed polyvinyl acetate having a viscosity of 13 cps. in a 4% solution at 25° C., in 425 g. of water and then adding 500 g. of a colloidal silica sol containing 50% by weight of $SiO_2$ in the form of colloidal particles 22 nanometers average diameter. The mixture is stirred, forming a viscous, white mass. It is then heated until homogeneous, and 5 grams of 70% nitric acid is added to lower the pH to 1.7. This gives a relatively clear, viscous syrup.

This solution is applied as a coating on a porous plastic sheet to render it slip-resistant so that it can be handled on application machinery, yet provides a surface to which adhesives will bond. The material is spread as a very thin film on the porous plastic sheet and dried, the dried film thickness being about one thousandth of an inch. The sheet is no longer slippery to handle, and the coating does not prevent bonding with adhesives used in fabricating the sheet into bags and other objects. The dry coating is not readily removed from the plastic sheet by cold water.

EXAMPLE 5

A frictionizing liquid is prepared and employed as in Example 4, but made with colloidal silica having an average particle size of 30 nanometers, and a polyvinyl alcohol having a characteristic viscosity of 60 cps. (Elvanol® 72.60).

EXAMPLE 6

A film-forming composition having maximum resistance to hot water is prepared following the procedure of Example 1, using a fully hydrolyzed polyvinyl alcohol having a characteristic viscosity of 125 cps. (Elvanol® 73–125) and a colloidal silica having a particle diameter of 3 nanometers, prepared by adding at 35° C. regenerated carboxylic acid type cation exchange resin to a solution of sodium silicate containing 10% $SiO_2$ and alkali equivalent to 3.1% $Na_2O$, to reduce the pH of the sodium silicate solution to 9, then filtering off the resin. The resulting alkali-stabilized silica sol containing 3 nm. particles of silica is diluted to a concentration of 5 g. of silica per 100 ml. and used within 6 hours in making a composition of this invention. A 5% solution of high molecular weight polyvinyl alcohol is prepared from the PVA. One part by volume of the PVA solution is mixed with one half part by volume of the 5% alkali-stabilized colloidal silica solution, and 12% nitric acid is added with good agitation to reduce the pH of the mixture to 2.5.

This composition dries to clear, strong films which do not dissolve in boiling water. The composition is spread on the grain side of leather, and dried to provide a strong coating resistant to penetration by gasoline. The coated leather is employed as a seal under the screw cap of a gasoline container.

EXAMPLE 7

A composition is prepared and used as in Example 4, except that colloidal silica of 30 nanometers in diameter is employed with polyvinyl alcohol prepared by hydrolyzing 88% of the acetate groups from polyvinyl acetate, and having a viscosity of 5 cps. (Elvanol® 51–05). The composition is made using 7.5 parts by weight of silica to 1 part by weight of polyvinyl alcohol. It is diluted to 1% solids and applied as a very thin film to vinyl flooring to give a lustrous finish with a high coefficient of friction, making it slip-resistant, and reducing pedestrian hazards.

EXAMPLE 8

A composition is prepared and used as in Example 7, except that a colloidal silica of 22 nanometer average particle size is employed, in a weight ratio to polyvinyl alcohol of 3:1.

EXAMPLE 9

A composition is prepared and used as in Example 7, except that colloidal silica of 14 nanometer average particle diameter is employed in a weight ratio of 2:1 to polyvinyl alcohol having a viscosity of 30 cps. The floor finish is slip-resistant and sufficiently water resistant that it can be wiped with a wet cloth without removing the finish.

EXAMPLE 10

A composition is prepared and used as in Example 9, except that the weight ratio of silica to polyvinyl alcohol is 3.5:1. The finish on the floor has excellent slip resistance.

EXAMPLE 11

A composition prepared and used as in Exmaple 9, but having a weight ratio of silica to PVA of 1.2:1, is resistant to water but is not resistant to dilute solution of alkaline detergent. For comparison, the composition having a silica to PVA ratio of only 0.5 is not water resistant, and is removed from the floor by wiping with warm water.

EXAMPLE 12

A composition prepared and used as the water-resistant composition in Example 11, having the same silica to PVA ratio of 1.2:1 but made with silica having a diameter of 9 nanometers is removed only by wiping with warm water containing an alkaline detergent but not by water alone.

I claim:
1. An aqueous acidic solution consisting essentially of polyvinyl alcohol of molecular weight such that a 4% by weight aqueous solution of the polyvinyl alcohol at 20° C., as determined by the Hoeppler falling ball method, is 5 to 150 cps., said polyvinyl alcohol containing no more than about 15% acetxoy groups, and colloidal silica sol, said silica sol having the average particle diameter d., of 3–30 nanometers, and the weight ratio of silica to polyvinyl alcohol, R, being at least 0.22 but in any event greater than the numerical value $0.0062\ d.^2$ and less than the numerical value of 0.25 d., d. being expressed in nanometers; the pH of said solution being less than about 6.

2. A solution of claim 1 having a pH within the range of 2–5.

3. A solution of claim 2 wherein the relationship between R, the silica/PVA weight ratio, and d., the average colloidal silica particle diameter in nanometers, is expressed graphically by the area ABEFGHCDIJKLA on the attached drawing, the parameters of A, B, C, D, E, F, G, H, I, J, K and L being as follows:

|   | d. | R |
|---|---|---|
| A | 3 | 0.22 |
| B | 3 | 0.75 |
| C | 30 | 7.5 |
| D | 30 | 5.6 |
| E | 6.4 | 1.6 |
| F | 10 | 1.6 |
| G | 13 | 2.0 |
| H | 24 | 6.0 |
| I | 12 | 0.89 |
| J | 10 | 0.89 |
| K | 8 | 0.89 |
| L | 6 | 0.22 |

4. A solution of claim 3, wherein the relationship between R and d. is expressed graphically by the area ABEFJKLA on the attached drawing.

References Cited

UNITED STATES PATENTS

| 2,251,296 | 8/1941 | Shipp | 260—29.6 B |
| 2,413,570 | 12/1946 | Krister et al. | 260—29.6 |
| 2,833,661 | 5/1958 | Iler | 260—29.6 |
| 2,972,594 | 2/1961 | Baker et al. | 260—29.6 |
| 3,272,675 | 9/1966 | Suzumura et al. | 260—29.6 |

HAROLD D. ANDERSON, Primary Examiner

U.S. Cl. X.R.

117—155 UA, 161 UZ; 260—29.6 WA, 41 A